United States Patent [19]

Weber et al.

[11] 3,770,287

[45] Nov. 6, 1973

[54] HYDRAULICALLY CONTROLLED HOLDING DEVICE

[75] Inventors: Jonathan T. Weber; B. Warren Brofft, both of Cincinnati, Ohio; Hugh J. Coyne, Covington, Ky.

[73] Assignee: Positrol, Inc., Cincinnati, Ohio

[22] Filed: Jan. 13, 1972

[21] Appl. No.: 217,577

[52] U.S. Cl............. 279/2, 82/44, 242/46.4, 242/72, 269/48.1
[51] Int. Cl............... B23b 31/30, B23b 31/40
[58] Field of Search................. 279/1 J, 1 L, 2, 279/4; 82/44; 242/46.4, 72; 269/48.1

[56] References Cited
UNITED STATES PATENTS

| | | | |
|---|---|---|---|
| 3,493,238 | 2/1970 | Ludwig | 279/4 |
| 2,684,854 | 7/1954 | Hohwart et al. | 279/2 |
| 2,733,873 | 2/1956 | Petersen | 279/2 |

FOREIGN PATENTS OR APPLICATIONS

| | | | |
|---|---|---|---|
| 1,074,746 | 4/1954 | France | 242/72 |
| 382,517 | 11/1964 | Switzerland | 279/4 |

Primary Examiner—Francis S. Husar
Attorney—John W. Melville

[57] ABSTRACT

Hydraulically controlled holding devices for accurately locating and securely locking parts in position during the performance of various manufacturing and testing operations. The holding devices may be in the form of arbors or chucks and each comprises a body having at one end a segmented sleeve. The body contains a closed hydraulic system with a piston for each sleeve segment and an actuating means for the simultaneous operation of all of the segment pistons. Each segment is deformable by its respective piston so that the part will be engaged at the end of the holding device with equal pressure by all of the segments upon proper adjustment of the actuating means.

22 Claims, 10 Drawing Figures

HYDRAULICALLY CONTROLLED HOLDING DEVICE

BACKGROUND OF THE INVENTION

1. Field of the Invention

The invention relates to hydraulically actuated holding devices in the form of arbors or chucks, and more particularly to such holding devices capable of engaging a workpiece or the like at the end of the holding device and with equal pressure about the workpiece.

2. Description of the Prior Art

Prior art workers have developed a number of different types of hydraulically actuated chucks and arbors. For example, chucks and arbors have been provided with elongated, thin-walled, cylindrical sleeves capable of being distorted to provide a uniform clamping action on a workpiece or part. U.S. Pat. No. 2,963,298 teaches an exemplary structure. There are instances, however, when it is desirable that the workpiece or part be engaged at the end of the holding device. Holding devices of the type having the elongated, distortable, cylindrical sleeve are not suited for this purpose because the ends of the sleeve must be sealed and hence the sleeve ends comprise zones of zero pressure.

U.S. Pat. No. 3,211,445 is exemplary of another form of hydraulically actuated arbor. In this instance, a cylindrical body is provided having equally spaced thereabout longitudinally extending clamping surfaces. Two of the clamping surfaces are fixed. The third is made up of one or more segments actuable by a row of hydraulic pistons. However, such a clamping means having three holding surfaces is subject to the lobe effect. That is, particularly with thin workpieces, the workpiece is slightly distorted out of round since it is being contacted only at three positions. Furthermore, such a structure again is not well suited at its end to engage a workpiece.

The present invention is directed to a holding device in the form of a chuck or an arbor which is particularly suited for the engagement of a workpiece at the end of the holding device. The holding device is provided with a closed hydraulic system so that pressure is equalized throughout. The segments of the holding device are of equal dimensions so that they will all engage the workpiece with equal pressure, thereby minimizing or substantially eliminating the lobe effect on the workpiece. Where concentricity between the diameter being held and any other diameter on the workpiece is important, the holding devices taught herein are capable of holding the workpiece to within .00005 TIR concentricity.

The holding devices described hereinafter are readily adaptable to any specific holding problem. Thus, by varying the size of the actuating piston in relation to the pistons operating the segments, the gripping force may be varied to any desired amount for a given force on the actuating piston. Furthermore, by increasing the number of segments, the gripping force can be increased.

Finally, the holding devices of the present invention are easy to maintain and are adaptable to substantially any form of machine tool, testing device or the like. As will be described hereinafter, the holding devices may be made light in weight. Further, since the gripping action is provided by plurality of segments, each segment being movable independently of the next, the clamping means may be used to grip an elliptical surface, or the various segments may be used to grip different surfaces.

SUMMARY OF THE INVENTION

Basically, each hydraulically controlled holding device of the present invention is designed to engage the part to be held at the end of the holding device. Each holding device comprises a body having a segmented sleeve at one end thereof. The body incorporates a self-contained and closed hydraulic system having a piston for each sleeve segment and an actuator means for the simultaneous operation of all of the segment pistons. A segment piston may have any one of a number of orientations with respect to its segment, but all of the segment pistons are intended to deform or bend their respective segments so that upon proper adjustment of the actuating means the part will be engaged by the various segments in a clamping action. Since the hydraulic system is a closed one, and since all of the segments are of the same width, each segment will exert an equal pressure on the part being held.

As will be evident hereinafter, the actuator means of the hydraulic system may take various forms. In addition, selected ones of the sleeve segments may be of different length or have different surface configurations so that more than one part may be simultaneously engaged by the holding device or the holding device may simultaneously engage various surfaces of a single part. Furthermore, the holding devices of the present invention are well suited to be used with collets so that a single holding device may be used to engage parts of various sizes.

The holding devices of the present invention may take the form of arbors or chucks. Three exemplary arbors and one exemplary chuck will be described hereinafter.

DESCRIPTION OF THE PREFERRED EMBODIMENTS

Figure 3:
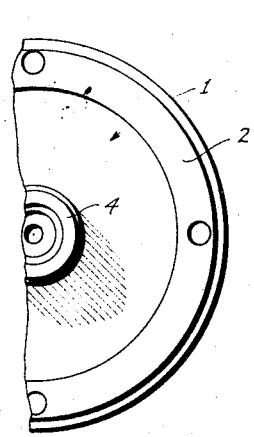
FIG. 3 is a fragmentary elevational view of the rearward end of the arbor of FIG. 1.
Figure 1:
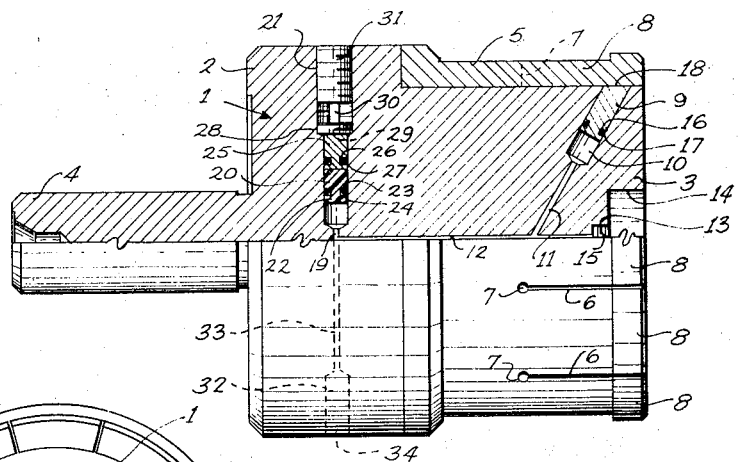
FIG. 1 is a side elevational view, partly in cross section, of a holding device of the present invention in the form of an arbor.
Figure 2:
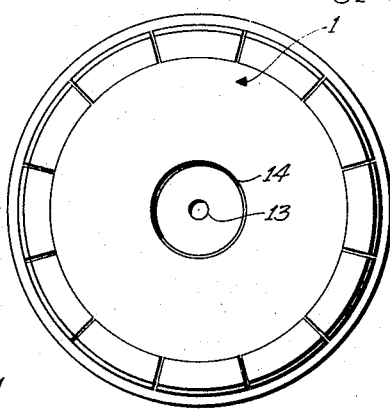
FIG. 2 is an elevational view of the forward end of the arbor of FIG. 1.

FIGS. 1 through 3 illustrate a holding device of the present invention in the form of an arbor. The arbor comprises a body (generally indicated at 1) having a rearward portion 2 and a forward portion 3 of reduced diameter. As will be understood by one skilled in the art, the body 1 may have any suitable and well known means for appropriate mounting on a machine tool, testing device or the like. For example, the rearward portion 2 of the body may be provided with flange mounting means for direct faceplate applications or it may be configured for any suitable spindle mounting. For purposes of an exemplary showing, the body 1 is illustrated as having an integral shaft 4 by which it may be appropriately mounted.

The forward end 3 of the body has a sleeve 5 mounted thereon. The sleeve 5 may be affixed to the arbor body by a press fit, or it may be held in place by screws or other fastening means (not shown). The forward portion of the sleeve 5 has about its periphery a plurality of evenly spaced longitudinal slots 6 extending from the forwardmost end of the sleeve to the points designated by the index numeral 7. The slots 6 divide the sleeve into a plurality of segments 8 of equal width.

The segments 8 are intended to receive a workpiece extending about their forward ends. The segments are bendable or distortable away from the body portion 3 so as to engage the workpiece in a clamping action. In order to accomplish this bending or distortion of the segments, a piston is provided beneath each segment. One such piston is illustrated at 9. The pistons 9 are a part of a closed and self-contained hydraulic system within the body 1, now to be described.

The piston 9 is located and is longitudinally slidable within an enlarged bore 10. The enlarged bore 10 communicates with a bore 11 of lesser diameter. The bore 11, in turn, communicates with a central bore 12.

The central bore 12 extends forwardly of the body to a threaded hole 13 of larger diameter. The threaded hole, in turn, communicates with a circular depression 14 in the forward face of the body. The hole 13 is adapted to receive a plug 15 threadedly engaged therein. The plug 15 seals the forwardmost end of the bore 12.

It will be understood that there will be an enlarged bore 10 and a smaller bore 11 equal in number to the number of segments 8 of the sleeve 5. Each of the bores 10 will be provided with a piston 9. Each of the pistons 9 has an annular notch 16 for an O-ring 17 to form an appropriate seal. The forward end 18 of each of the pistons 9 will be configured as shown to properly contact the underside of its respective sleeve segment 8.

The other end of the bore 12 terminates in a bore 19, the axis of which is perpendicular to the axis of the bore 12 and the axis of the arbor body 1. The bore 19 communicates with a larger bore 20, which in turn communicates with an even larger bore 21. The bore 21 is provided with internal threads. Located in the bore 20 there is a first piston 22 having an annular notch 23 for an O-ring 24. Above the piston 22 there is a second piston 25 having an annular notch 26 for an O-ring 27.

While it would be within the scope of the invention to provide a single piston, it is preferred to provide the pair of pistons 22 and 25. The piston 22 may be made of Teflon or similar material noted for its sealing characteristics. The piston 25 may be made of brass or like material of excellent wear characteristics.

The pistons 22 and 25 are maintained within the bore 20 by the disc-like element 28 threadedly engaged in the bore 21. The element 28 has a central perforation 29 adapted to slidably receive the rod-like portion 30 of an actuator screw 31. The actuator screw 31 is threadedly engaged in the bore 21. The exposed end of the actuator screw may have a slot or other suitably configured depression (not shown) for the receipt of the end of a tool.

Finally, means may be provided for introducing hydraulic fluid into the closed system. An exemplary means is illustrated in FIG. 1 comprising a threaded bore 32 terminating in a passage or bore 33 leading to the central bore 12. A plug 34 is threadedly engaged in the bore 32.

The operation of the embodiment of FIGS. 1 through 3 may be described as follows. While any suitable hydraulic fluid may be used, grease has been found to serve the purpose with excellent results. If the arbor has not been previously provided with hydraulic fluid, the threaded plug 34 is removed and the actuator screw 31 is turned until its exposed surface is substantially flush with the surface of the body portion 2. A grease fitting may be inserted in the threaded bore 32 and grease may be injected into the system by a grease gun or the like. The grease gun is then removed and the actuator screw is turned inwardly until grease comes out of the refilled bore 32. The actuator screw is then returned to a position wherein its exposed end is flush with the body portion 2 and additional grease is added. This assures that air pockets will not be present in the system. Caution must be practiced to assure that the arbor is not pressurized by the grease gun. When filling is complete, the refill plug 34 is reinserted in the bore 32.

When the arbor is ready for use and has been properly affixed to the machine, testing device or the like, the workpiece or part may be placed about the forward ends of the segment 8. The actuator screw may then be manually turned (through the use of an appropriate tool) until the workpiece or part is firmly engaged by the segments 8. Turning of the actuator screw 31 will cause its integral rod-like portion 30 to move downwardly through the element 28 and move the pistons 25 and 22 forwardly. This, in turn, will cause the pistons 9 of the segments to distort or bend their respective segments so that the part or workpiece will be properly engaged. When the workpiece is to be released, the actuator screw will be turned outwardly. The resilience of the segments will cause them to return to their normal position shown in FIGS. 1 and 2. The segments 8, in turn, will move their respective pistons 9 downwardly in the bores 10. As a consequence, the pistons 22 and 25 will be moved toward the threaded element 28.

While the sleeve 5 may be made of any suitable material, they will normally be fabricated of steel. The body 1 may also be made of any suitable material. For example, it to could be made of steel, or it could be made of aluminum or the like. The holding device of the present invention makes use of the properties of metal, i.e., the homegeneity, elasticity and predictable mechanical properties of metal. Each of the segments may be regarded as a cantilever beam, fixed at one end and loaded at the other by a force produced by the closed hydraulic system. Since the system is closed, the pressure is equalized throughout. All of the pistons 9 are of equal diameter so that the force on all of the segments is the same. All of the segments are of the same width, and in the embodiment of FIGS. 1 through 3 they are all of the same length. Thus, the deflection at the end of all of the segments will be the same enabling the achievement of a high degree of concentricity.

Even if the surface of the workpiece engaged by the segments departs from the circular, and some of the segments are required to deflect more than others, they will nevertheless all grip the workpiece with substantially equal pressure. Furthermore, the forwardmost ends of the segments may have any appropriate exterior configuration to properly engage the particular part or workpiece to be held.

As will be shown hereinafter, the positioning of the bores 20 and 21, cylinders 22 and 25, threaded element 28 and actuator 31 is not critical. This entire actuation assembly for the hydraulic system may be positioned anywhere within the body 1 where its location will be most convenient and most accessible, depending upon the particular application to which the arbor is put. The same is true of the fill or refill system 32 through 34.

Figure 4:
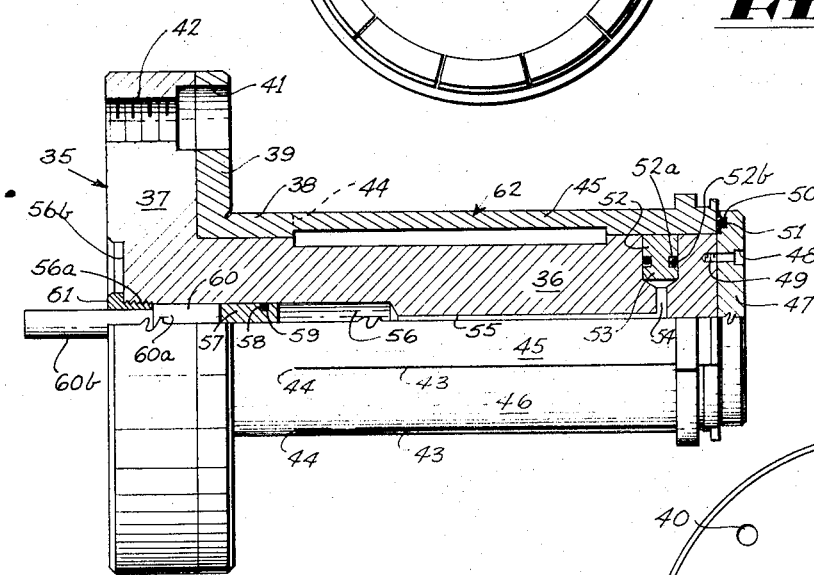
FIG. 4 is a side elevational view, partly in cross section, of another embodiment of the holding device of the present invention in the form of an arbor.
Figure 5:
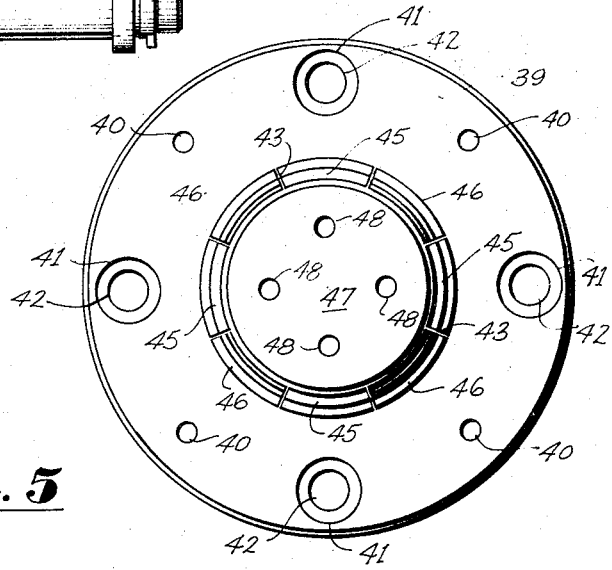
FIG. 5 is an elevational view of the forward end of the arbor of FIG. 4.

FIGS. 4 and 5 illustrate another embodiment of the holding device of the present invention in the form of an arbor. In this embodiment, the arbor body is generally indicated at 35 and comprises a cylindrical forward portion 36 and a rearward portion 37 of greater diameter. The cylindrical portion 36 has a sleeve 38. Again the sleeve may be affixed thereto by a press fit, by screws or other suitable fastening means. For purposes of an exemplary showing, the rearward portion 37 of the body 35 is illustrated as being configured to form a flange so that the arbor may be flange mounted for direct faceplate applications. The sleeve 38 is provided with a matching flange portion 39 having the same diameter as the body portion 37 and lying adjacent thereto. The portion 39 of the sleeve may have perforations 40 (see FIG. 5). The body portion 37 will have concentric perforations (not shown) so that the sleeve flange 39 may be affixed to the body portion 37 by machine screws, bolts, or other suitable fastening means (not shown). In the same manner, the flange portion 39 of the sleeve may have additional perforations 41 therein. The body portion 37 may have coaxial perforations 42 so that the assembly may be mounted to a faceplate or the like, again by bolts, machine screws or other fastening means (not shown).

The sleeve 38 is provided with a plurality of longitudinally extending slots extending from the forwardmost end of the sleeve to the points designated at 44. The slots 43 are evenly spaced about the sleeve 38 and divide it into a plurality of segments 45 and 46 of equal width. It will be noted that the segments 45 are alternately spaced with respect to the segments 46. The segments 45 and 46 differ only in their endmost configuration. While their endmost configuration will depend upon the part they are to engage, the embodiment of FIG. 4 is exemplary of the fact that selected segments may be used to grip one surface on the part, while the remaining segments may be used to grip another surface on the part. Alternatively, the segments 45 may be used to grip one part while the segments 46 may be used to grip another so that the arbor may grip two parts simultaneously.

In the embodiment of FIG. 4, the forwardmost end of the body 35 is provided with an end plate 47. The end plate 47 may have appropriate perforations 48 therein and the body end may have matching perforations (one of which is shown at 49) so that the end plate may be affixed to the body by machine screws or the like. The end plate 47 has an annular groove 50 thereabout for receipt of an O-ring 51. The O-ring 51 makes a seal with the ends of the segments 45 and 46 to prevent the accumulation of fines and other foreign material between the segments and the body portion 46.

As in the case of the embodiment of FIGS. 1 through 3, each segment of the arbor of FIG. 4 is actuated by a piston, one of which is shown at 52. The piston 52 is slidably mounted in a bore 53 and has an annular notch 52a for an O-ring 52b. The bore 53 leads to another bore 54 which, in turn, communicates with a central bore 55 extending longitudinally of the arbor body 35. Again it will be understood that there will be piston 52 and bores 53 and 54 for each segment.

The central bore 55 terminates in an enlarged bore 56, which in turn opens into a threaded hole 56a. The threaded hole is located in a central depression 56b in the rear face of the body 35. Slidably mounted in the bore 56 is a piston 57 having an annular notch 58 for the receipt of an O-ring 59. Behind the piston 57 a plunger 60 is slidably mounted in the bore 56. The plunger 60 has an enlarged forward end 60a and an elongated rearward end 60b of smaller diameter. The plunger 60 is rendered captive within the bore 56 by a fitting 61 threadedly engaged in the hole 57.

The operation of the embodiment of FIGS. 4 and 5 is substantially the same as that described with respect to the embodiment of FIGS. 1 through 3. In this instance, however, the plunger 60 serves the purpose of the actuator screw 31 of FIG. 1. The plunger 60 may be moved longitudinally in the bore 56 by any suitable means such as a cam, or other external source such as an air cylinder or the like for automatic actuation. The large diameter forward portion 60a of the plunger 60 may serve the same purpose as the piston 25 of FIG. 1 and may be provided with an annular notch for the receipt of an O-ring (not shown). The piston 57 may be the equivalent of the piston 22 of FIG. 1. Alternatively, a piston (not shown) equivalent to the piston 25 of FIG. 1 may be located between the plunger 60 and the piston 57.

It will be noted that the pistons 52 are oriented with their axes perpendicular to their respective segments. Otherwise, they serve the same purpose and function in the same manner described with respect to the pistons 9 of FIG. 1.

Since the segments 45 and 46 are considerably longer in the embodiment of FIGS. 4 and 5, they may be provided with a portion of reduced thickness to aid in their proper distortion or bending. This is generally indicated at 62 in FIG. 4.

Otherwise, the embodiment of FIG. 4 operates in the same manner described with respect to the embodiment of FIG. 1 and has the same characteristics and advantages. Again the body 35 and the sleeve 38 may be made of any suitable materials. For example, the sleeve may be made of steel or the like and the body may be made of steel, aluminum or other suitable material. The fact that the body 35 may be made of aluminum enables it to be easily manufactured and light in weight.

Figure 6:
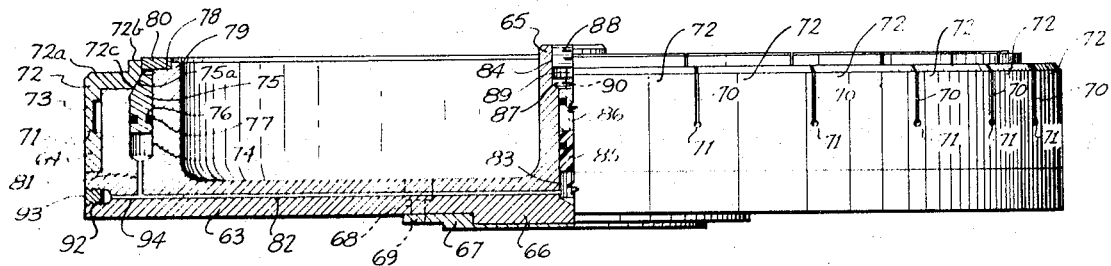
FIG. 6 is an elevational view, partly in cross section, of another embodiment of the present invention.
Figure 7:
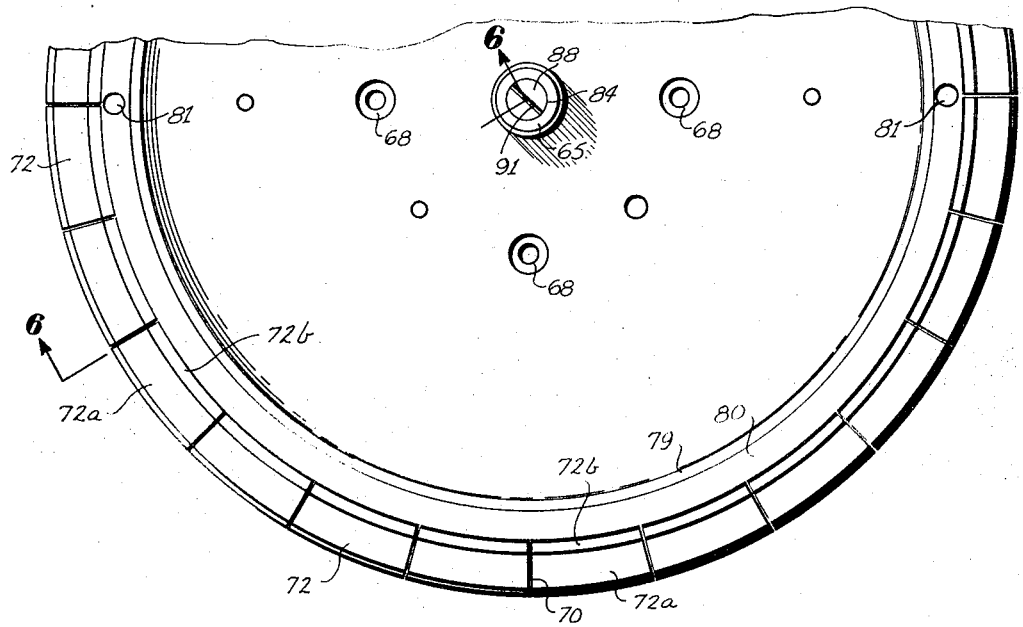
FIG. 7 is a fragmentary elevational view of the forward end of the arbor of FIG. 6.

FIGS. 6 and 7 illustrate yet another form of end-holding arbor of the present invention. While not so limited, the arbor of FIGS. 6 and 7 is particularly adapted for use with relatively large diameter work pieces or parts and where it is desirable that the arbor be relatively light in weight. As in the case of the previously described embodiments, this arbor comprises a body 63 provided at its forward end with a sleeve 64.

While the sleeve 64 is illustrated as being affixed to the body 63 by a press fit, it will be understood by one skilled in the art that bolts, screws or other fastening means could be used. The body 63 has a forwardly extending central hub 65 and a circular rearward extension 66 which may be surrounded by an adapter plate 67. The body is provided with a plurality of perforations 68. The adaper plate 67 has matching perforations, one of which is shown at 69. These perforations are adapted to receive machine screws, or the like by which the arbor may be affixed to a machine tool, testing device or the like. It will be understood that the hollow dish-like configuration of the arbor body 63 will insure that it is relatively light in weight, particularly if the body is made of aluminum or like material.

The sleeve 64 is provided with a plurality of slits 70 extending rearwardly to the points designated by the index numeral 71. This divides the sleeve 64 into a plurality of segments 72 of equal dimensions. Again, to facilitate the proper bending or distortion of the segments, they may be relieved so as to provide a portion of lesser thickness. This portion is indicated at 73. In the particular exemplary embodiment, the segments 72 have downwardly depending forward portions 72a terminating in forwardly extending portion 72b. In normal use, a work piece will rest upon the annular rim 80 and be engaged by the segment portion 72b. Beneath each segment, the arbor body 63 will have a large diameter bore 74. A piston 75 with an annular notch 76 for an o-ring 77 will be slidably mounted in each bore 74. The piston 75 has a floating forward surface 75a adapted to cooperate with a sloping surface 72c on the segment 72. As will be evident, when the piston 75 is moved forwardly, the two last mentioned sloping surfaces will cooperate to cause an upward or outward movement of the segment 72.

The forward portion of the body 63 has a forwardly facing surface 78 adjacent a shoulder 79. An annular rim 80 is affixed to the surface 78, adjacent the shoulder 79. As is shown in FIG. 7, the rim 80 may be provided with perforations 81 by which it may be affixed to the arbor body surface 78 by machine screws or the like.

Each of the large diameter bores 74 terminates in a smaller diameter bore 81. The bores 81 communicate with bores 82 extending radially from a bore 83 in the hub 65 of the arbor. FIG. 6 illustrates but one exemplary manner in which hydraulic fluid may be transmitted from the bore 83 to the bores 81, i.e. by providing a bore 82 for each segment cylinder.

The bore 83 opens into an enlarged threaded bore 84. The bores 83 and 84 being equivalent to the bores 20 and 21 in FIG. 1. The bore 83 carries a first piston 85 and a second piston 86 equivalent to pistons 22 and 25 of FIG. 1, respectively. Thus, the piston 85 may be of teflon or like material and the piston 86 may be of brass or other material of good wear characteristics.

The bore 84 carries a threaded element 87 equivalent to the threaded element 28 of FIG. 1. The bore 84 further has a threaded actuator screw 88 having an integral rod like element 89 passing through a perforation 90 in the threaded element 87. The exposed end of the actuator screw 88 may have a slot 91 (see FIG. 7) and/or other suitable depression for the receipt of a hand tool or the like.

The operation of the arbor of FIGS. 6 and 7 is substantially identical to that described with respect to FIG. 1. When the actuator screw 88 is turned inwardly, its integral rod like portion 89 will cause pistons 85 and 86 to move rearwardly in the bore 83. This, in turn, will cause forward movement of all of the segment pistons 75 since all of the segment piston bores 74 communicate with the bore 83 through the bores 81 and the radial bores 82. Again, since all of the segments are of the same dimension and since the hydraulic system is a closed, self-contained one, all of the segments will engage the work piece with a uniform pressure. While not so limited, the sleeve 64 is preferably made of steel. In any event, when the actuator screw 88 is turned outwardly in the bore 84, the segments 72 will cause their respective pistons 75 to move rearwardly to their normal, unactuated position.

At any convenient position within the body 63 a refill port for the hydraulic fluid may be located. For purposes of an examplary showing a bore 92 having a threaded plug 93 is shown connected to one of the radial bores 82 by a bore 94. The method by which the closed hydraulic system of FIG. 6 is filled or refilled is identical to that described with respect to FIG. 1.

Figure 8:
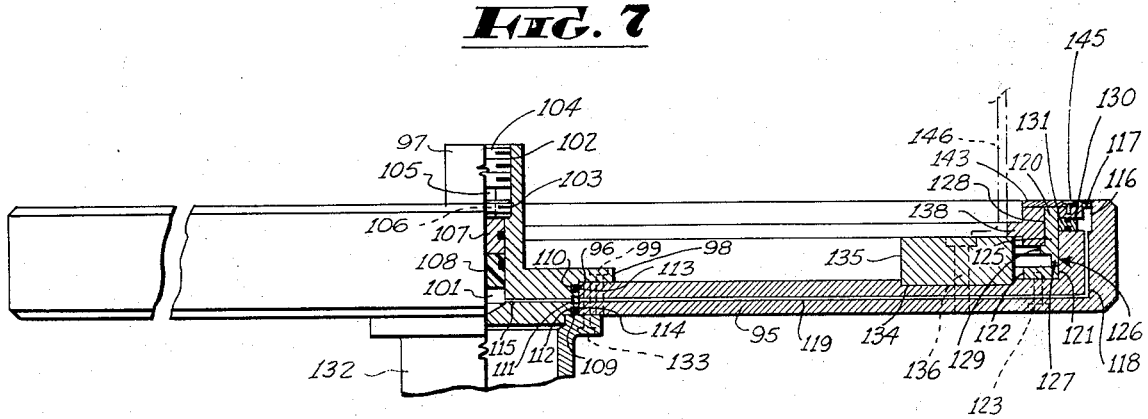
FIG. 8 is a side elevational view, partly in cross section, of an embodiment of the holding device of the present invention in the form of a chuck.
Figure 9:
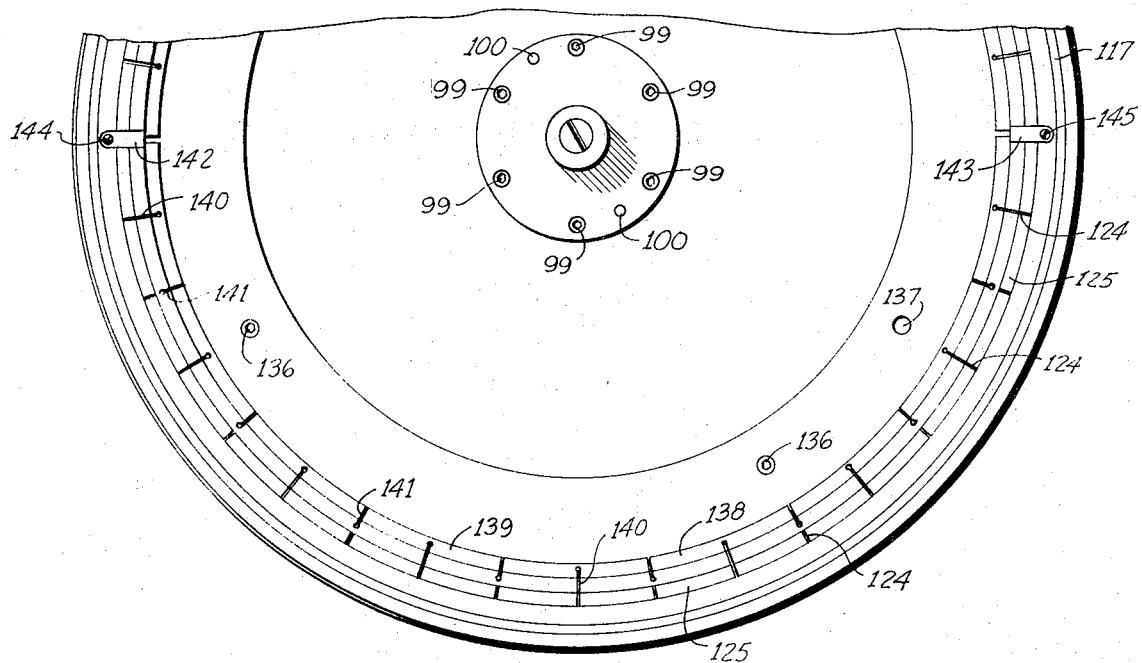
FIG. 9 is a fragmentary elevational view of the forward end of the chuck of FIG. 8.

FIGS. 8 and 9 illustrate a holding device of the present invention in the form of a chuck. In this instance, a dish-like body 95 is provided, similar to the body 63 of the arbor of FIG. 6. The body 95 may be made of steel or like material, or where it is important that the chuck be light in weight, aluminum or the like may be used. In this instance, the body 95 has a central perforation 96. Received within this central perforation is a hub member 97 of steel or the like. The hub 97 has an annular flange 98 by which it may be affixed to the body 95 by machine screws 99. Strengthening and locating dowels may also be used as at 100 (see FIG. 9).

The hub 97 has a central bore 101 and a threaded bore 102. The bore 102 contains a threaded element 103 and an actuator screw 104 having an integral rodlike portion 105 passing through a perforation 106 in the threaded element 103. The bore 101 contains a pair of pistons 107 and 108. The pistons 107 and 108 are provided with o-rings and may be brass and teflon, respectively. The bore 101, 102, the threaded element 103, the actuator screw 104 and the pistons 107 and 108 are the full equivalent the bore 20, the bore 21, the actuator screw 31, the threaded element 28 and the pistons 25 and 22 of FIG. 1, and function in the same manner. The The cylindrical hub surface 109 adjacent the inside surface of the perforation 96 in the body 95 has three annular grooves 110, 111 and 112. The grooves 110 and 112 carry o-rings 113 and 114 respectively. The groove 111 serves as an annular passage for hydraulic fluid. The annular passage 111 communicates with the bore 101 through one or more radial passages 115.

The forward portion of the chuck body 95 has an annular fluid passage 116 therein. This passage may be formed by machining an annular groove in the body and closing the forward portion of the groove by an annular ring 117, welded or otherwise affixed in place. The annular passage 116 and the annular passage 111 are in communication with each other by means of the longitudinal bore 118 and the radial bore 119. By reason of the provision of annular passsges 111 and 116, it is not necessary to provide a bore 115 and bores 118 and 119 equal in number to the number of segments in the sleeve to be described hereinafter. In some instances, a single bore 115 and single bores 119 and 118 will suffice. In other instances, it may be desirable to provide a small number of bores 115, 119 and 118. An internal sleeve 120 is located adjacent the cylindrical inside surface 121 of the body 95. The sleeve 120 may have an inturned flange or rim-like portion 122 by which it may be affixed to the body 95 by machine screws or the like, one of which is indicated at 123. As is shown in FIG. 9, the sleeve is provided with a plurality of slits 124 dividing the sleeves into equal segments 125 of like dimensions. Each of the slits 124 extends longitudinally of the sleeve to a position indicated at 126 in FIG. 8. It will further be noted that the sleeve 120 may be provided with a portion of lesser thickness 127 to facilitate its proper bending or distortion. Finally, each segment is provided with an inside surface 128 and a shoulder 129, the purpose of which will be described hereinafter.

A radial bore 130 extends from the annular passage 116 to the inside surface 121 of the chuck body 95. There is a bore 130 for each segment 125. Each bore 130 carries a piston 131 provided with an o-ring.

The chuck thus far described may be operated in substantially the same manner described with respect to the previous embodiments. It will be noted that the hydraulic system is again a closed and self-contained one so that adjustment of the actuator screw 104 will cause desired movement of the pistons 131 and hence the segments 125. Since the hydraulic system is a closed one and since the segments are of equal dimension, the segments will engage the part or work piece firmly and with equal pressure throughout. Again, as described with respect to the embodiments of FIGS. 1 through 5, the exterior surface configuration of the segments may be varied depending upon the work piece to be held. Furthermore, selected segments may have different configurations from the others or may be of different length so that the various segments may engage more than one surface on a part or may engage more than one part simultaneously. In either event, so long as the segments are of the same dimension, they will engage the part or parts with equal pressure. The same is true in the case of a part which departs from the circular. Although under these circumstances some of the segments may have to bend or deform to a greater extent than others, they will still engage the part with substantially equal pressure.

The chuck of FIGS. 8 and 9 may be affixed to a machine tool, testing device or the like by any suitable means. For purposes of an exemplary illustration, a typical machine adapter 132 is shown affixed to the body 95 by machine screws or the like, one of which is shown at 133.

FIGS. 8 and 9 also show that the chuck may be used with the collets so that a given chuck may engage parts of various sizes. To this end, the body 95 is shown as having a wide, shallow annular groove 134. A support block 135 is located in this groove and is affixed to the body 95 by machine screws 136. Again, additional strengthening and locating dowels may be provided, one of which is shown at 137 in FIG. 9.

FIGS. 8 and 9 show a collet 138. Any contractable collet may be used, as for example those taught in U. S. Pat. No. 3,030,120 . The collet 138 is shown as divided into equal segments 139 by slits 140 and 141 extending inwardly from the outside surface of the collet and outwardly from the inside surface of the collet, respectively. The collet is supported on the support block 135, sleeve surface 128 and sleeve shoulder 129. The collet is held in place by keys 142 and 143 affixed to the body 95 by screws 144 and 145 respectively. The keys are located in slots in the forward surfaces of this sleeve 120 and the collet 138. For purposes of an exemplary showing, a work piece 146 is indicated in dotted lines as abutting the support block 135 and being engaged by the collet 138.

Figure 10:
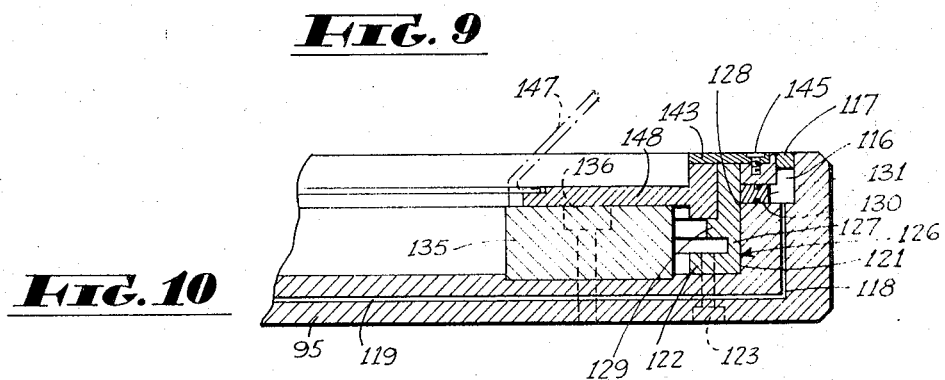
FIG. 10 is a fragmentary cross sectional view of the embodiment of FIG. 8 illustrating the use of a different collet.

FIG. 10 is a fragmentary cross sectional view of the FIG. 8 and like parts have been given like index numerals. FIG. 10 differs from FIG. 8 only in that different work piece are indicated in dotted lines at 147 and a different collet is shown at 148. The collet operates and is supported in the same manner described with respect to FIGS. 8 and 9, but is larger so that the chuck can be used with a part or work piece of smaller diameter. The figure further shows that engagement surfaces on the collet may be appropriately configured depending upon those surfaces on the work piece to be engaged.

Modifications may be made in the invention without departing from the spirit of it. For example, the arbor of FIGS. 6 and 7 could be provided with the simplified, closed hydraulic system illustrated in FIG. 8. This is particularly true where the sleeve has a great many segments. On the other hand, the chuck of FIGS. 8 and 9, where the number of segments is not great, could have the closed hydraulic system illustrated in FIG. 6. Furthermore, all of the embodiments of the present invention could have a cam operated or other automatically operated actuator system, as described with respect to FIG. 4. The chuck of FIG. 8 will be provided with some form of refill port, as for example of the type whown in FIG. 6.

From the above description, it will be noted that the holding means of the present invention are versatile and their bodies and sleeves, together with the sleeve segments, can be appropriately configured depending upon the part or parts to be engaged. While all of the embodiments are shown as having bodies and sleeves of circular cross section, this is not intended to constitute a limitation on the present invention. The bodies and sleeves could have any appropriate cross section (depending upon the part or parts to be engaged) and including oval, rectangular, or the like.

All of the embodiments are capable of of achieving superior concentricity and repeatability.

Finally, all of the embodiments of the present invention may be configured to have any suitable engagement with the machine tool, testing device or the like, with which they are to be associated. Furthermore, the actuator assembly and the refill port may be located in any suitable and convenient positions within the body. While it is indicated above that a pair of pistons is preferred in the actuator assembly, single pistons may be used or the actuator assembly could comprise the plunger 60 only.

The embodiments of the invention in which an exclusive property or privilege is claimed are defined as follows:

1. An hydraulically actuated holding device for accurately locating and securely locking a part during the performance of various manufacturing and testing operations, said holding device comprising a body having forward and rearward ends, a sleeve mounted on said body, said sleeve having a forward end adjacent said forward end of said body, said sleeve having a plurality of slots spaced thereabout and extending longitudinally of said sleeve from said forward sleeve end rearwardly to the line of intersection of said sleeve and a plane perpendicular to the sleeve axis and spaced rewardly from said sleeve forward end, said slots dividing said sleeve into segments, said sleeve being made of resilient material whereby said segments are bendable away from said body into clamping relationship with said part, and means to bend the said segments into said clamping relationship with said part comprising a closed hydraulic system within said body, said hydraulic system comprising a piston for each segment, each piston contacting its respective segment and being movable between their positions wherein its respective segment is adjacent said body and wherein said piston bends its respective segment into clamping contact with said part, and actuator means for moving all of said segment pistons simultaneously.

2. The structure claimed in claim 1 wherein means are provided at said rearward end of said body for mounting said holding device on a machine tool, testing device and the like.

3. The structure claimed 1 wherein said segments are of equal width.

4. The structure claimed in claim 1 wherein said segments are of equal dimensions.

5. The structure claimed in claim 1 wherein said segments are of equal dimension, selected ones of said segments having a different external configuration from the remaining segments, whereby said holding device may clamp more than one surface on said part or may clamp more than one part simultaneously.

6. The structure claimed in claim 1 wherein said body and said sleeve are of circular cross section.

7. The structure claimed in claim 1 wherein said sleeve is made of steel.

8. The structure claimed in claim 1 wherein said body is made of steel.

9. The structure claimed in claim 1 wherein said body is made of aluminum.

10. The structure claimed in claim 1 wherein said holding device comprises an arbor, said sleeve being mounted about the exterior of said body.

11. The structure claimed in claim 1 wherein said holding device comprises a chuck, said body being hollow at its forward end, said sleeve being mounted within that body adjacent the inside surface thereof.

12. The structure claimed in claim 1 wherein said actuator means comprises an actuator screw and at least one actuator piston movable by said actuator screw.

13. The structure claimed in claim 1 wherein said actuator means comprises a plunger movable longitudinally by means external of said body.

14. The structure claimed in claim 1 wherein said hydraulic system and said segments are such that all of said segments clamp said part with equal pressure.

15. The structure claimed in claim 1 wherein said hydraulic system includes port means for refilling said system with hydraulic fluid.

16. The structure claimed in claim 1 wherein said actuator means is located centrally of said body, said hydraulic system including a common passage, additional passages equal in number to the number of said segment pistons and joining said segment pistons to said common passage, said actuator means being connected to said common passage by at least one radial passage.

17. The structure claimed in claim 1 wherein said body has a central, axial perforation, a hub mounted on said body within said perforation, with said hydraulic system including a common passage within said body, additional passages equal in number to the number of said segment pistons and connecting said segment pistons to said common passage, said actuator means being located within said hub, said hub having a common passage, said common passage within said body and said common passage within said hub being connected by at least one radial passage, said actuator means being connected to said common passage within said hub by at least one radial passage.

18. The structure claimed in claim 12 including two actuator pistons, one of said pistons being brass, the other of said pistons being made of a plastic material.

19. The structure claimed in claim 13 wherein said actuator means includes a piston movable axially by said plunger.

20. The structure claimed in claim 13 wherein said actuator means comprises a pair of pistons movable axially by said plunger, one of said pistons being brass, the other of said pistons being made of plastic material.

21. The structure claimed in claim 10 wherein said hydraulic system and said segments are such that all of said segments clamp said part with equal pressure.

22. The structure claimed in claim 11 wherein said hydraulic system and said segments are such that all of said segments clamp said part with equal pressure.

* * * * *